(12) United States Patent
Miao et al.

(10) Patent No.: US 10,161,276 B2
(45) Date of Patent: Dec. 25, 2018

(54) METHOD AND SYSTEM FOR NON-UNIFORM CATALYST HEATING FOR INTERNAL COMBUSTION ENGINE

(71) Applicant: GM Global Technology Operations LLC, Detroit, MI (US)

(72) Inventors: Yong Miao, Ann Arbor, MI (US); Steven Felix, Davisburg, MI (US); Kurt Alfred Wellenkotter, Beverly Hills, MI (US)

( * ) Notice: Subject to any disclaimer, the term of this patent is extended or adjusted under 35 U.S.C. 154(b) by 115 days.

(21) Appl. No.: 15/186,836

(22) Filed: Jun. 20, 2016

(65) Prior Publication Data
US 2017/0362982 A1     Dec. 21, 2017

(51) Int. Cl.
| | |
|---|---|
| *F01N 3/20* | (2006.01) |
| *F01N 11/00* | (2006.01) |
| *F02D 41/02* | (2006.01) |
| *F01N 9/00* | (2006.01) |

(52) U.S. Cl.
CPC ............. *F01N 3/2026* (2013.01); *F01N 9/00* (2013.01); *F01N 11/002* (2013.01); *F02D 41/0255* (2013.01); *F01N 2560/06* (2013.01); *F01N 2900/12* (2013.01); *F01N 2900/1602* (2013.01); *F01N 2900/1626* (2013.01)

(58) Field of Classification Search
CPC ........ F01N 13/009; F01N 3/2026; F01N 3/28; F01N 3/281; F01N 3/2821; F01N 2330/04; H05B 3/10; H05B 3/12
See application file for complete search history.

(56) References Cited

U.S. PATENT DOCUMENTS

| | | | | |
|---|---|---|---|---|
| 5,146,743 A | * | 9/1992 | Maus | ........................ B01J 35/04 422/174 |
| 5,215,722 A | * | 6/1993 | Nishizawa | ............ F01N 3/2026 422/171 |
| 5,582,805 A | * | 12/1996 | Yoshizaki | ............. F01N 3/2026 422/174 |
| 2009/0071126 A1 | * | 3/2009 | Gonze | ..................... F01N 3/025 60/286 |
| 2011/0258984 A1 | * | 10/2011 | Santoso | ................ F01N 3/2006 60/274 |

* cited by examiner

*Primary Examiner* — Phutthiwat Wongwian
*Assistant Examiner* — Matthew T Largi

(57) ABSTRACT

A method and system for non-uniform catalyst heating for reducing exhaust gas emissions when the catalyst is below a predetermined light off temperature is provided. The method includes providing a catalyst formed of a plurality of electrically conductive subsections and at least one catalyst heating device that is operable to heat at least one of the plurality of electrically conductive subsections of the catalyst to form at least one predetermined non-uniform heating pattern. A heater control module is provided for controlling the operation of the at least one catalyst heating device. If the engine is in a cold start condition, then the heater control module causes the at least one catalyst heating device to heat at least one of the electrically conductive subsections of the catalyst to obtain a first predetermined non-uniform heating pattern.

16 Claims, 4 Drawing Sheets

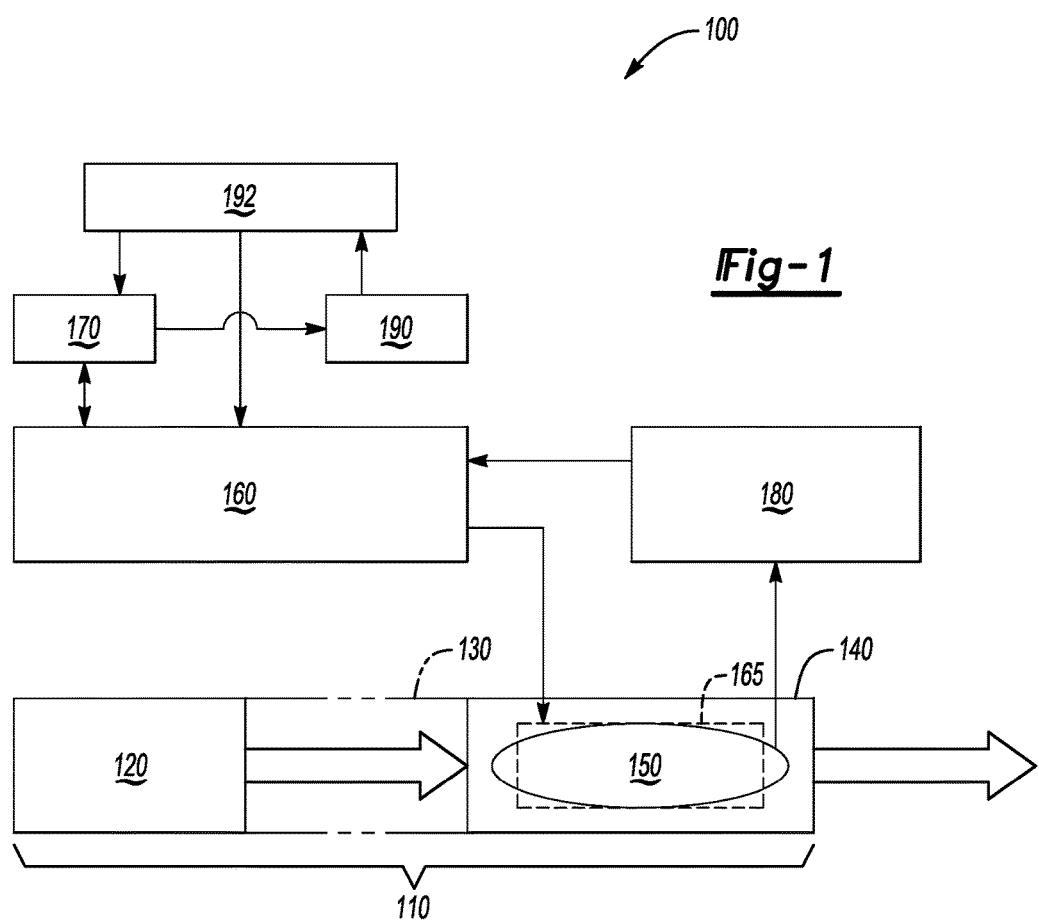

METHOD AND SYSTEM FOR NON-UNIFORM CATALYST HEATING FOR INTERNAL COMBUSTION ENGINE

FIELD

Apparatuses consistent with exemplary embodiments relate to a method for engine exhaust gas treatment. More particularly, apparatuses consistent with exemplary embodiments relate to a method for non-uniform catalyst heating for reducing exhaust gas emissions during engine operation.

BACKGROUND

The emissions benefit in catalytically treating internal combustion engine exhaust gas, such as by passing the exhaust gas through a catalytic converter, is generally accepted. Generally, the catalyst used in such converters is able to purify pollutants in the exhaust gas only when the temperature of the catalyst becomes higher than a certain temperature, i.e., the catalyst in the converter does not work when the temperature is lower than the activation temperature of the catalyst.

Usually, the catalyst in the converter is gradually heated by the exhaust gas and reaches the activation temperature after the engine starts (commonly referred to as "light-off" temperature). However, when the temperature of the engine is low, for example, after a cold start of the engine, it takes a long time to heat the catalyst to the light-off temperature since the heat of the exhaust gas is removed by the cold wall of the exhaust passage before it reaches the converter. Therefore, the exhaust gas of the engine is not sufficiently purified during the period where the temperature of the catalyst is lower than the light-off temperature. In some cases, it may take several minutes before the catalyst begins to work during which time exhaust gas pollutants are emitted into the environment.

To improve the efficiency of the catalytic converters, heating devices were introduced inside the converter assemblies. The heating devices become energized just after the engine is started, bringing the catalyst up to its light-off temperature sooner allowing for faster and increased emissions purification to occur during cold start.

Traditional heating devices in catalytic converters are basically used to apply heating to the entire catalyst front face or the entire catalyst body. Although both of these methods of heating the catalyst are known to demonstrate faster and increased emissions purification during cold start in comparison to non-heated converter assemblies, there is still some period between cold start and the catalyst reaching light-off temperature where emissions purification is not occurring. The following exemplary embodiments seek to further address the emissions purification limitations between engine cold start and when the catalyst attains light-off temperature.

SUMMARY

One or more exemplary embodiments address the above issue by providing a method and system of non-uniform heating of a catalyst during an engine cold start, engine idle or engine low-load condition or conditions when the catalyst temperature is below a predetermined light off temperature. More particularly, one or more exemplary embodiments provide a method for non-uniform catalyst heating for reducing exhaust gas emissions when the catalyst is below a predetermined light off temperature.

According to an aspect of an exemplary embodiment, a method and system for non-uniform catalyst heating for reducing exhaust gas emissions when the catalyst is below a predetermined light off temperature is provided. The method includes providing a catalyst formed of a plurality of electrically conductive subsections and at least one catalyst heating device that is operable to heat at least one of the plurality of electrically conductive subsections of the catalyst to form at least one predetermined non-uniform heating pattern.

A heater control module is provided for controlling the operation of the at least one catalyst heating device. When the engine is started, the at least one catalyst heating device is energized. The heater control module determines if the engine is in a cold start condition. If the engine is in a cold start condition, then the heater control module causes the at least one catalyst heating device to heat at least one of the electrically conductive subsections of the catalyst to obtain a first predetermined non-uniform heating pattern. If the engine is in an idle or low load condition, as opposed to a cold start condition, then the heater control module causes the at least one catalyst heating device to heat at least one of the electrically conductive subsections of the catalyst to obtain a second predetermined non-uniform heating pattern.

According to an aspect of an exemplary embodiment, the method further includes providing a temperature sensor in communication with the catalyst and the heater control module for measuring and reading the temperature of the catalyst, respectively.

According to another aspect of an exemplary embodiment, providing the heater control module further includes, comparing the measured catalyst temperature to a predetermined light off temperature shutting off the at least one catalyst heating device if the measured catalyst temperature is equal to the predetermined light off temperature.

According to another aspect of an exemplary embodiment, providing a heater control module further includes continuously monitoring the catalyst temperature while the engine is on.

According to a further aspect of an exemplary embodiment, providing a heater control module further includes determining if the catalyst temperature becomes less than the predetermined light off temperature when the engine is on and then re-energizing the at least one catalyst heating device if the catalyst temperature becomes less than the predetermined light off temperature when the engine is on.

According to another aspect of an exemplary embodiment, providing a heater control module further includes determining if a heating period for the at least one catalyst heating device is equal to a predetermined maximum heating period.

According to further aspect of an exemplary embodiment, providing a heater control module further includes sending an error code to an engine control module and shutting off the at least one catalyst heating device if the heating period for heating the catalyst equals the predetermined maximum heating period.

According to another aspect of an exemplary embodiment, a system for non-uniform catalyst heating for reducing exhaust gas emissions during an engine cold start is provided. The system includes a heated catalytic converter integrated in the exhaust passage of an internal combustion engine for removing pollutants in the exhaust gas. A catalyst having a radius formed from a plurality of electrically conductive subsections is disposed in the heated catalytic converter. Each of the plurality of electrically conductive subsections of the catalyst are in communication with at least one catalyst heating device. A heater control module is in communication with the catalyst heating device and is operable to cause the at least one catalyst heating device to selectively and individually heat each of the plurality of electrically conductive subsections of the catalyst.

A temperature sensor is in communication with the heater control module and the catalyst. The heater control module is operable to read the temperature sensor and to cause the at least one catalyst heating device to heat the catalyst in at least one predetermined non-uniform heating pattern when the catalyst temperature is less than the predetermined light off temperature. When the catalyst temperature equals the predetermined light off temperature, the heater control module causes the at least one catalyst heating device to shut off.

According to another aspect of an exemplary embodiment, the heater control module is operable to shut off the at least one catalyst heating device when a catalyst heating period equals a predetermined maximum heating period.

According to a further aspect of an exemplary embodiment, the heater control module is further operable to generate an error code when the catalyst heating period equals the predetermined maximum heating period.

According to yet another aspect of an exemplary embodiment, the heater control module is operable to send the generated error code to an engine control unit when the catalyst heating period is equal to the predetermined maximum heating period.

According to another aspect of an exemplary embodiment, the at least one catalyst heating device is an electric heating device.

According to another aspect of an exemplary embodiment, the at least one catalyst heating device is an inductive heating device.

According to a further aspect of an exemplary embodiment, the at least one catalyst heating device is operable to heat the catalyst in a first predetermined non-uniform heating pattern when the engine is in a cold start condition.

According to a further aspect of an exemplary embodiment, the at least one catalyst heating device is operable to heat the catalyst a second predetermined non-uniform pattern when the engine is in an idle or low load condition.

According to yet another aspect of an exemplary embodiment, the first predetermined non-uniform heating pattern is a cylindrical volume that extends along a center axis of the catalyst having a radius not greater than one half of the catalyst radius.

According to still another aspect of an exemplary embodiment, the second predetermined non-uniform heating pattern is a hollow cylindrical volume that extends along a center axis of the catalyst less a cylindrical volume that extends along the center axis of the catalyst having a radius not less than three fourths of the catalyst radius.

According to a further aspect of an exemplary embodiment, the heater control module is operable to shut off the at least one catalyst heating device when a heating period is equal to a predetermined maximum heating period.

According to yet another aspect of an exemplary embodiment, the heater control module is operable to shut off the at least one heater when the catalyst temperature is equal to a predetermined catalyst light off temperature.

According to another aspect of an exemplary embodiment, the heater control module is operable to re-energize the at least one heater when the catalyst temperature becomes less than a predetermined catalyst light off temperature when the engine is on.

Other objects, advantages and novel features of the exemplary embodiments will become more apparent from the following detailed description of exemplary embodiments and the accompanying drawings.

BRIEF DESCRIPTION OF THE DRAWINGS

The present invention will be better understood from the description as set forth hereinafter, with reference to the accompanying drawings, in which:

FIG. 1 is an illustration of a system diagram of a heated catalytic converter for heating a catalyst when the catalyst is below a predetermined light off temperature in accordance with an exemplary embodiment;

DETAILED DESCRIPTION OF THE INVENTION

Figure 2A:
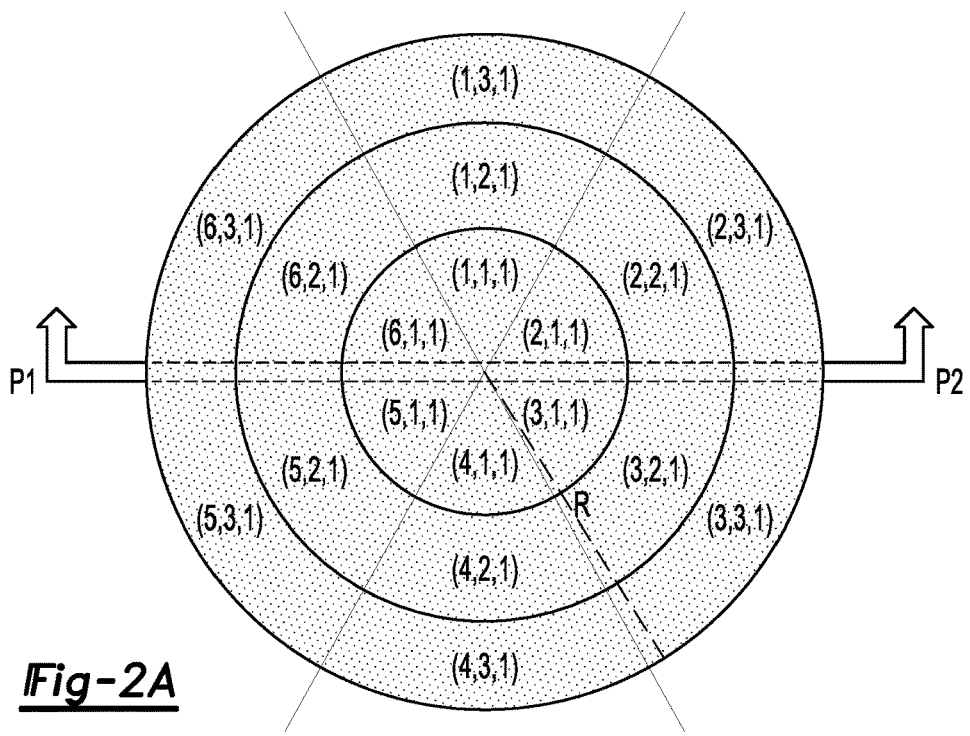
FIG. 2A is an illustration of a cross sectional frontal view of a catalyst formed from a plurality of electrically conductive subsections in accordance with an exemplary embodiment.

The following description is merely exemplary in nature and is not intended to limit the present disclosure, application, or uses.

FIG. 1 provides an illustration of a system 100 diagram of a heated catalytic converter for heating a catalyst when the catalyst is below a predetermined light off temperature in accordance with an exemplary embodiment. It is appreciated that a catalytic converter in accordance with the exemplary embodiment can be utilized to reduce pollutants in exhaust gases produced by engines of all types that burn gasoline, diesel, or alternative fuels used as combustibles. For example, the catalytic converter in accordance with this exemplary embodiment may be utilized to reduce emissions in passenger, commercial, and recreational vehicles; agricultural vehicles and machinery; lawn mowers, snow blowers, generators and other outdoor machinery and equipment.

The system 100 includes an exhaust gas passageway 110 configured to receive exhaust gas from the engine exhaust manifold 120. The exhaust gas flows through an exhaust gas tube 130 until it enters a heated catalytic converter 140. Disposed within the heated catalytic converter 140 is a catalyst 150. In accordance with this exemplary embodiment, the catalyst 150 is formed of a plurality of electrically conductive subsections to be discussed in more detail in FIGS. 2A and 2B.

The catalyst 150 material in accordance with this exemplary embodiment is preferably a mix of precious metals capable of catalytically reacting with the engine exhaust gas such that reduction and/or oxidation events occur as the engine exhaust gas passes through the heated catalytic converter 140 which can be either a two-way or three-way catalytic converter system. Some examples of precious metal material used for such purpose in an exemplary embodiment are platinum, palladium, rhodium, cerium and nickel. It is appreciated that catalytic converters are only effective at reducing pollutants in engine exhaust gases after the internal catalyst temperature has been sufficiently raised to an activation or "light-off" temperature.

Prior to reaching the light-off temperature, exhaust gas pollutants flow through the catalytic converter unaffected and into the environment. Accordingly, it is important that the catalyst light-off temperature is achieved as quickly as possible after the engine is started from a cold condition to maximize the effectiveness of catalytic converter systems. Exhaust gas temperature is effective for raising the catalyst temperature to light-off but it could take up to several minutes which is undesirable.

In accordance with an aspect of this exemplary embodiment, a heater control module 160 is in communication with at least one catalyst heating device 165 disposed within the heated catalytic converter 140. The heater control module 160 is operable to energize the at least one catalyst heating device 165 when the engine is started and to cause the at least one heating catalyst device 165 to selectively heat at least one of the plurality of electrically conductive subsections of the catalyst 150 to obtain at least one predetermined non-uniform heating pattern. The at least one catalyst heating device 165 in a preferred exemplary embodiment is an electric heater in communication with each of the at least one electrically conductive subsections of the catalyst to form individual sub-circuits.

In an alternative exemplary embodiment, the at least one catalyst heating device 165 is an inductive heater that is operable to heat at least one of the electrically conductive subsections of the catalyst by selectively subjecting individual subsections to magnetic fields created by varying the frequency of an alternating current (AC). For heating a subsection at or near the surface of the catalyst, a high frequency AC is used to produce the magnetic field, and for heating subsections near the core of the catalyst a lower frequency AC is used to produce the magnetic field.

When the engine is in a cold start condition, the heater control module 160 is operable to cause the at least one catalyst heating device 165 to selectively heat at least of the plurality of electrically conductive subsections of the catalyst to obtain a first predetermined non-uniform heating pattern. When the engine is in an idle or low load condition, the heater control module causes the at least one catalyst heating device to selectively heat at least one electrically conductive subsection of the catalyst to obtain a second predetermined non-uniform heating pattern.

It is appreciated that if using the same heat energy density, the period for heating the entire catalyst 150 until light-off temperature is obtained would be longer than the period it would take for strategically heating a portion or subsection of the catalyst 150 to obtain light-off temperature in that portion or subsection. As such, using the heat control module 160 to cause the at least one catalyst heating device 165 to selectively heat at least one electrically conductive subsection of the catalyst 150 to obtain at least one predetermined non-uniform heating pattern would result in obtaining faster and more effective catalytic converter emissions reduction from an engine cold start condition. In accordance with aspects of the exemplary embodiments, the volume of the at least one predetermined non-uniform heating pattern is less than the volume of the entire catalyst.

An engine control unit (ECU) 170 and a temperature sensor 180 are also in communication with the heater control module 160. The heater control module 160 reads the temperature sensor 180 which is also in communication with the catalyst 150 for measuring the catalyst temperature. If the heater control module 160 determines that the catalyst temperature is equal to a predetermined catalyst light off temperature then the heater control module 160 shuts off the at least one catalyst heating device 165. While the engine is on, the heater control module 160 continuously reads the catalyst 150 temperature. If the heater control module 160 determines that the catalyst 150 temperature becomes less than the predetermined catalyst light off temperature then the heater control module 160 re-energizes the at least one catalyst heating device 165. In accordance with an aspect of the exemplary embodiment, the heater control module 160 and the ECU 170 are separate and distinct but in alternative exemplary embodiments a single unit, such as the ECU 170, may be operable to manage the control of the at least one catalyst heating device 165.

It is appreciated that under normal circumstances the catalyst light off temperature should stay above the predetermined catalyst light off temperature when the engine operating under regular conditions but the light off temperature may become less than the predetermined catalyst light off temperature when the engine is under low load or an idle condition.

The heating control module 160 is further operable to determine if a catalyst heating period is equal to a predetermined maximum catalyst heating period. Repeated overheating of the catalytic converter 140 can cause it to fail and require repair or replacement. If the heater control module 160 determines that the catalyst heating period is equal to the predetermined maximum catalyst heating period then the heater control module 160 sends an error code to the ECU 170 and shuts off the at least one catalyst heating device 165 to prevent damage from being caused due to overheating.

The system 100 of a heated catalytic converter for heating a catalyst during a cold start condition in accordance with an exemplary embodiment also includes a generator 190 and a battery 192 for supplying energy to the system. The generator 190 is in communication with the heater control module 160 which in turn provides energy for the heated catalytic converter. The battery 192 is in communication with the generator 190 for storing excess energy generated and for supplying operating energy to the heater control module 160 and ECU 170.

Figure 2B:
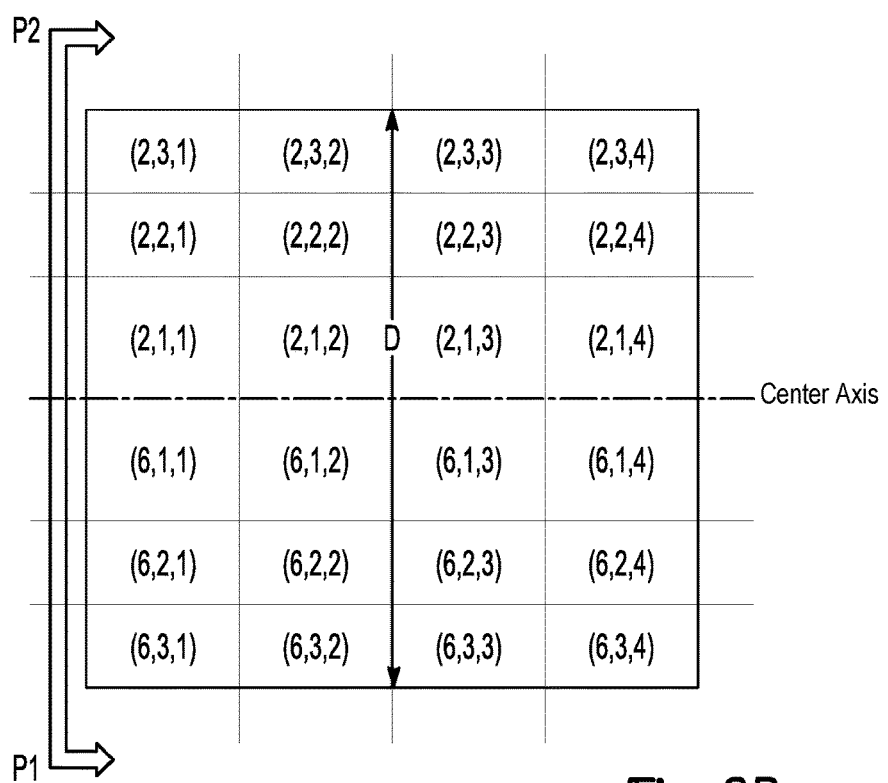
FIG. 2B is an illustration of a cross sectional longitudinal side view of a catalyst formed from a plurality of electrically conductive subsections in accordance with an exemplary embodiment.

Referring to FIGS. 2A and 2B, in accordance with aspects of the exemplary embodiment, FIG. 2A illustrates a cross sectional frontal view 200A of a catalyst 150 formed from a plurality of electrically conductive subsections and FIG. 2B illustrates a cross sectional longitudinal side view 200B of a catalyst 150 formed from a plurality of electrically conductive subsections. Each of the plurality of electrically conductive subsections of the catalyst 150 represents one heating unit that can be selectively heated individually. Each of the plurality of electrically conductive subsections an angular position (X), a radial position (Y), and an axial position (Z). In accordance with aspects of the exemplary embodiment, the catalyst 150 is formed of 72 subsections or individual heating units designated (b 1,1,1) through (6,3,4). The catalyst 150 includes a radius (R) in accordance with FIG. 2A, a diameter (D) and a center axis in accordance with FIG. 2B.

During a cold start condition, the heater control module 160 causes the at least one catalyst heating device 165 to selectively heat at least one of the electrically conductive catalyst subsections of the catalyst 150 to obtain a first predetermined non-uniform heating pattern. In an aspect of an exemplary embodiment, only the subsections near the front face and center axis of the catalyst 150 will be heated by the at least one catalyst heating device 165. As such, in FIG. 2A subsections (1,1,1), (2,1,1), (3,1,1), (4,1,1), (5,1,1), and (6,1,1) are heated and the other subsections are off.

In another exemplary embodiment, the subsections along the entire center axis from the front to the rear of the catalyst 150 are heated by the at least one catalyst heating device 165 while the others are off such that a first predetermined non-uniform heating pattern is obtained. Accordingly, subsections (1,1,1), (2,1,1), (3,1,1), (4,1,1), (5,1,1), (6,1,1); (1,1,2), (2,1,2), (3,1,2), (4,1,2), (5,1,2), (6,1,2); (1,1,3), 2,1,3), (3,1,3), (4,1,3), (5,1,3), (6,1,3); and (1,1,4), (2,1,4), (3,1,4), (4,1,4), (5,1,4), (6,1,4) are heated and the other subsections are off. (All subsections not shown in the FIGS. 2A and 2B)

It is appreciated that generally the exhaust gas flow rate is greater at the center of the catalyst 150 due to friction against the gas flow at the exhaust passageway 110 wall. Therefore, heating the catalyst 150 near the center axis allows for faster light off temperature to be attained in this region resulting in better catalytic converter performance from a cold start condition.

In another aspect of an exemplary embodiment, during an idle or low load engine condition, the heater control module 160 causes the at least one catalyst heating device 165 to selectively heat at least one electrically conductive subsections of the catalyst 150 to obtain a second predetermined non-uniform heating pattern. In an aspect of an exemplary embodiment, only the subsections near the outer surface from the front to the rear of the catalyst 150 are selectively heated while the other subsections are off. Accordingly, subsections (1,3,1), (2,3,1), (3,3,1), (4,3,1), (5,3,1), (6,3,1); (1,3,2), (2,3,2), (3,3,2), (4,3,2), (5,3,2), (6,3,2); (1,3,3,), (2,3,3), (3.3.3), (4,3,3),(5,3,3), (6,3,3); and (1,3,4), (2,3,4), (3,3,4), (4,3,4), (5,3,4), (6,3,4). (All subsections not shown in the FIGS. 2A and 2B)

When the engine is at low load or idle it is possible that the catalyst temperature could fall below the light off temperature due to heat being lost at the surface of the catalyst 150. By heating the outer surface of the catalyst in the second predetermined non-uniform heating pattern the light off temperature can be maintained as according to an aspect of the exemplary embodiment.

It is appreciated that the most effective heating pattern of the non-uniform catalyst heating system and method disclosed in the exemplary embodiments can change based on the design of the exhaust after treatment system, catalyst formulation, catalyst aging, catalyst poisoning, and engine calibrations.

Figure 3:
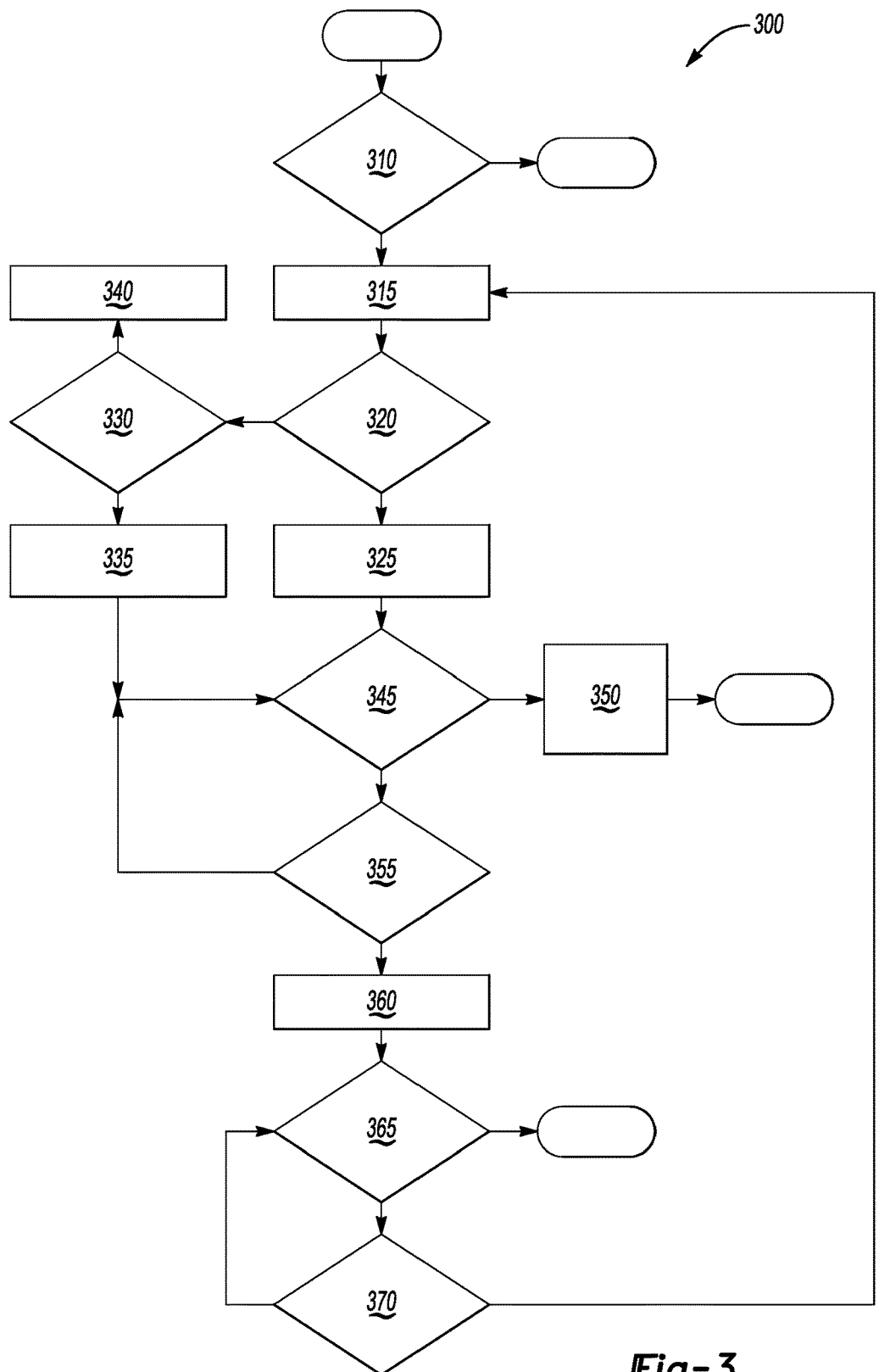
FIG. 3 is a flow diagram of an algorithm for non-uniform heating of a catalyst in a heated catalytic converter in accordance with an exemplary embodiment.

Referring now to FIG. 3, a flow diagram of an algorithm 300 for non-uniform heating of a catalyst in a heated catalytic converter in accordance with an exemplary embodiment is illustrated. Starting from block 310, the heater control module 160 determines if the engine has been started. If the heater control module 160 determines the engine has been started then, at block 315, the heater control module energizes the at least one catalyst heating device 165. If the engine is not started then the heater control module 160 continues to monitor the engine at block 310.

At block 320, the heater control module 160 determines if the engine is in a cold start condition. If the heater control module 160 determines that the engine is in a cold start condition then, at block 325, the heater control module 160 causes the at least one catalyst heating device 165 to heat at least one of a plurality electrically conductive subsections of the catalyst 150 to obtain a first predetermined non-uniform heating pattern. If the heating control module 160 determines that the engine is not in a cold start condition then the method continues at block 330.

At block 330, the heater control module 160 determines if the engine is in a low load or idle condition. If the heater control module 160 determines that the engine is in a low load or idle condition then the heater control module 160 causes the at least one catalyst heating device 165 to heat at least one of the electrically conductive subsections of the catalyst 150 to obtain a second predetermined non-uniform heating pattern. If the heater control module 160 determines that the engine is not in a low load of idle condition then, at block 340, the heater control module shuts off the at least one catalyst heating device 165. The method continues at block 345.

At block 345, the heater control module 160 determines if the catalyst heating period is equal to a predetermined maximum catalyst heating period. If the heater control module 160 determines that the catalyst heating period is equal to the predetermined maximum catalyst heating period then, at block 350, the heater control module 160 sends an error code to the ECU 170 and shuts off the at least one catalyst heating device 165. If the heater control module 160 determines that the catalyst heating period is not equal to a predetermined maximum catalyst heating period then the method continues to block 355.

At block 355, the heater control module 160 determines if the catalyst 150 temperature is equal to a predetermined catalyst light off temperature. If the heater control module 160 determines that the catalyst temperature is equal to a predetermined catalyst light off temperature then, at block 360, the heater control module 160 shuts off the at least one catalyst heating device 165. If the heater control module 160 determines that the catalyst temperature is not equal to the predetermined catalyst light off temperature then the method returns to block 345.

At block 365, the heater control module 160 determines is the engine is on. If the heater control module 160 determines that the engine is not on then the method is over until the engine is started again. If the heater control module 160 determines that the engine is on then, at block 370, the heater control module 160 determines if the catalyst temperature is less than the predetermined catalyst light off temperature. If the heater control module 160 determines that the catalyst temperature is less than the predetermined catalyst light off temperature then the method returns to block 315 where the at least one catalyst heating device is re-energized. If the heater control module 160 determines that the catalyst temperature is not less than the predetermined catalyst light off temperature then the method returns to block 365 where the heater control module 160 determines if the engine is still on.

Figure 4:
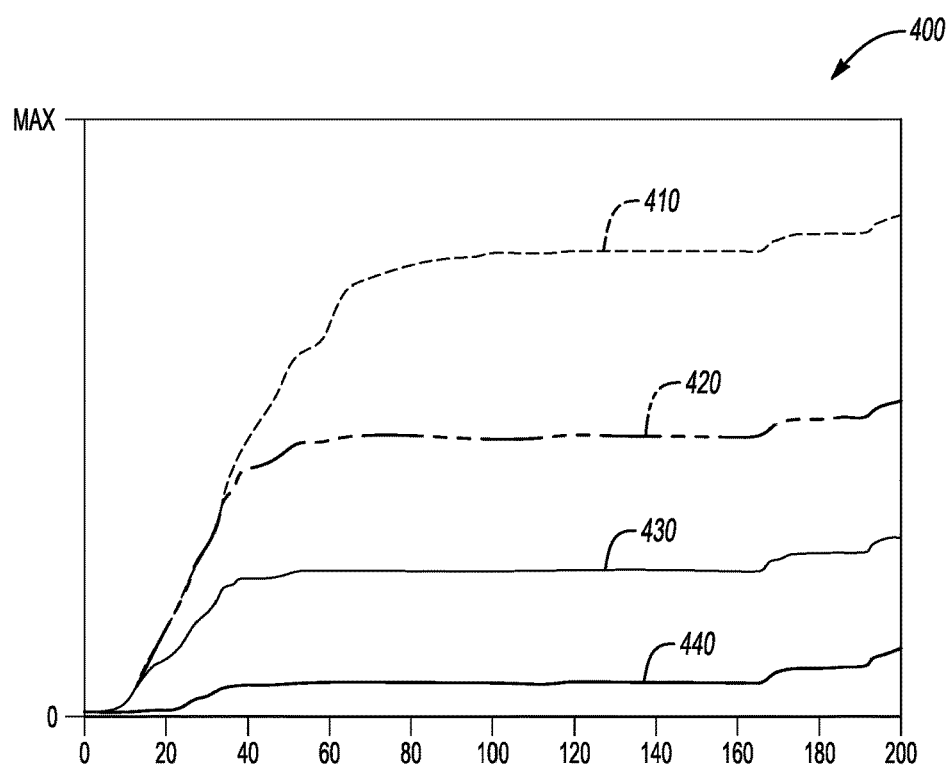
FIG. 4 is an illustration of a graph of accumulated carbon monoxide being output in exhaust gas versus time from a catalytic converter being non-uniformly heated in accordance with an exemplary embodiment.

FIG. 4 is an illustration of a graph of accumulated carbon monoxide being output in exhaust gas versus time from a catalytic converter being non-uniformly heated in accordance with an exemplary embodiment. The graph 400 illustrates Federal Test Procedure (FTP) 75 results of a heated catalyst converter in the exhaust passageway of a medium duty engine. The catalyst disposed in the catalytic converter is heated from a cold start condition by a 2 kW heating device for 100 seconds after the engine is started. The 2 kW heating device applies heat to the catalyst in predetermined heating patterns from zero to one hundred percent of the catalyst volume.

At the 410 plot, no heating is being applied to the diesel oxidation catalyst (DOC) converter. After one hundred seconds the results show that the amount of accumulated carbon monoxide (CO) content in the exhaust gas at the outlet of the (DOC) converter is the highest in view of the amount of CO content in the exhaust gas at the outlet of the heated catalytic converters as illustrated in the following descriptions.

For example, at the 420 plot, 100% of the DOC is being heated. After one hundred seconds the results show that the amount of accumulated carbon monoxide (CO) content in the exhaust gas at the outlet of the DOC converter is approximately 40% less than when no heat is applied to the DOC. Accordingly, it is acceptable to conclude that heating from a cold start condition will result in the DOC having better emissions reduction performance than not heating the DOC from a cold start condition.

At the 430 plot of FIG. 4, the DOC is heated in a non-uniform pattern of 50% of its total volume for one hundred seconds. The results show that the amount of accumulated carbon monoxide (CO) content in the exhaust gas at the outlet of the DOC converter is further reduced to approximately 67% less than when no heat is applied to the DOC. This shows that using the same amount of heat energy over a lesser volume of the DOC improves emissions reduction performance in view of not heating the DOC or when heating 100% of the DOC and the amount of heat energy is constant.

At the 440 plot, the DOC is heated in a non-uniform pattern of 20% of its total volume for one hundred seconds. Again, the results show that the amount of accumulated carbon monoxide (CO) content in the exhaust gas at the outlet of the DOC converter is still further reduced to approximately 92% less than when no heat is applied to the DOC and approximately 85% less than when heating was applied to 100% of the DOC.

Figure 5:
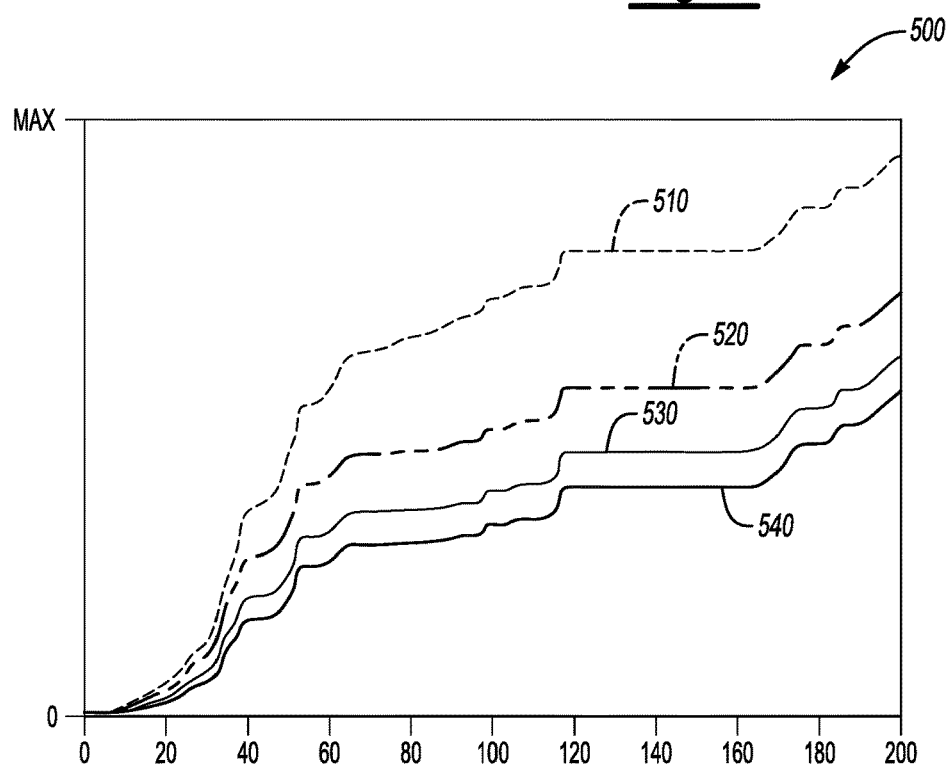
FIG. 5 is an Illustration of a graph of accumulated hydrocarbons in exhaust gas being output versus time from a catalytic converter being non-uniformly heated in accordance with an exemplary embodiment.

FIG. 5 is an Illustration of a graph 500 of accumulated hydrocarbons in exhaust gas being output versus time from a catalytic converter being non-uniformly heated in accordance with an exemplary embodiment. As in the previous example of FIG. 4, the graph 500 illustrates Federal Test Procedure (FTP) 75 results of a heated catalyst converter in the exhaust passageway of a medium duty engine. The catalyst disposed in the catalytic converter is heated from a cold start condition by a 2 kW heating device for 100 seconds after the engine is started. The 2 kW heating device applies heat to the catalyst in predetermined heating patterns from zero to one hundred percent of the catalyst volume.

At plot 510, no heating is being applied to the diesel oxidation catalyst (DOC) converter. After one hundred seconds the results show that the amount of accumulated hydrocarbon (HC) content in the exhaust gas at the outlet of the (DOC) converter is the highest in view of the amount of HC content in the exhaust gas at the outlet of the heated catalytic converters as illustrated in the below descriptions.

At plot 520, 100% of the DOC is being heated. After one hundred seconds the results show that the amount of accumulated hydrocarbon (HC) content in the exhaust gas at the outlet of the DOC converter is approximately 30% less than when no heat is applied to the DOC.

At plot 530, the DOC is heated in a non-uniform pattern of 50% of its total volume for one hundred seconds. The results show that the amount of accumulated hydrocarbon (HC) content in the exhaust gas at the outlet of the DOC converter is further reduced to approximately 45% less than when no heat is applied to the DOC. It is appreciated that the DOC has an inherent HC storage capacity so emissions reduction performance is not as significant as with CO.

At plot 540, the DOC is heated in a non-uniform pattern of 20% of its total volume for one hundred seconds. Again, the results show that the amount of accumulated hydrocarbon (HC) content in the exhaust gas at the outlet of the DOC converter is still further reduced to approximately 55% less than when no heat is applied to the DOC and approximately 33% less than when heating was applied to 100% of the DOC.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); a discrete circuit; an integrated circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, if used above, means that some or all code from multiple modules may be executed using a single (shared) processor. In addition, some or all code from multiple modules may be stored by a single (shared) memory. In addition, some or all code from a single module may be stored using a group of memories.

The apparatuses and methods described herein may be partially or fully implemented by one or more computer programs executed by one or more processors. The computer programs include processor-executable instructions that are stored on at least one non-transitory tangible computer readable medium. The computer programs may also include and/or rely on stored data. Non-limiting examples of the non-transitory tangible computer readable medium include nonvolatile memory, volatile memory, magnetic storage, and optical storage.

What is claimed is:

1. A method of heating a catalyst of a catalytic converter during an engine cold start condition comprises:
    providing a catalyst having an outer surface and formed of a plurality of electrically conductive subsections;
    providing at least one catalyst heating device for selectively heating at least one of the plurality of electrically conductive subsections of the catalyst;
    providing a temperature sensor for measuring the catalyst temperature;
    energizing the at least one catalyst heating device when the engine is started; determining if the engine is in a cold start condition; and
    providing a heater control module for causing the at least one catalyst heating device to selectively heat the at least one of the plurality of electrically conductive subsections of the catalyst to obtain a first predetermined non-uniform heating pattern when the engine is in a cold start condition wherein only subsections of the plurality of electrically conductive subsections near a front face and a center axis of the catalyst will be heated by the at least one catalyst heating device while other subsections of the plurality of electrically conductive subsections are off, and a second predetermined non-uniform heating pattern when the engine is in an idle or low load condition wherein only subsections of the plurality of electrically conductive subsections near the outer surface from a front to a rear of the catalyst are selectively heated while other subsections of the plurality of electrically conductive subsections are off.

2. The method of claim 1, further comprising determining if a catalyst heating period is equal to a predetermined maximum catalyst heating period.

3. The method of claim 2, further comprising sending an error code to an engine control module and shutting off the at least one catalyst heating device when the catalyst heating period is equal to the predetermined maximum catalyst heating period.

4. The method of claim 1, further comprising determining if a measured catalyst temperature is equal to a predetermined catalyst light off temperature.

5. The method of claim 4, further comprising shutting off the at least one heating device when the measured catalyst temperature is equal to the predetermined catalyst light off temperature.

6. The method of claim 5, further comprising re-energizing the at least one heater if the measured catalyst temperature becomes less than the predetermined catalyst light off temperature.

7. The method claim 1, wherein providing at least one catalyst heating device further comprises providing an electric heater.

8. The method claim 1, wherein providing at least one catalyst heating device further includes providing a conductive heater.

9. A heated catalytic converter system comprising:
a catalytic converter disposed in an exhaust passage of an engine;
a catalyst having an outer surface and a radius formed of a plurality of electrically conductive subsections disposed within the catalytic converter;
at least one catalyst heating device for heating at least one of the plurality of electrically conductive subsections of the catalyst;
a temperature sensor for measuring a temperature of the catalyst; and
a heater control module for supplying power to the at least one catalyst heating device when the engine starts and being operative to cause the at least one catalyst heating device to independently heat the at least one of the plurality of electrically conductive subsections of the catalyst to create a first predetermined non-uniform heating pattern when the engine is in a cold start condition wherein only subsections of the plurality of electrically conductive subsections near a front face and a center axis of the catalyst will be heated by the at least one catalyst heating device while other subsections of the plurality of electrically conductive subsections are off, and a second predetermined non-uniform heating pattern when the engine is in an idle or low load condition wherein only subsections of the plurality of electrically conductive subsections near the outer surface from a front to a rear of the catalyst are selectively heated while other subsections of the plurality of electrically conductive subsections are off.

10. The heated catalytic converter of claim 9, wherein the at least one catalyst heating device is an electric heating device.

11. The heated catalytic converter of claim 9, wherein the at least one catalyst heating device is an inductive heating device.

12. The heated catalytic converter of claim 9, wherein the first predetermined non-uniform heating pattern is a cylindrical volume that extends along a center axis of the catalyst having a radius not greater than one half of the catalyst radius.

13. The heated catalytic converter of claim 9, wherein the second predetermined non-uniform heating pattern is a hollow cylindrical volume that extends along a center axis of the catalyst less a cylindrical volume that extends along the center axis of the catalyst having a radius not less than three fourths of the catalyst radius.

14. The heated catalytic converter of claim 9, wherein the heater control module is operable to shut off the at least one catalyst heating device when a heating period is equal to a predetermined maximum heating period.

15. The heated catalytic converter of claim 9, wherein the heater control module is operable to shut off the at least one catalyst heating device when the catalyst temperature is equal to a predetermined catalyst light off temperature.

16. The heated catalytic converter of claim 15, wherein the heater control module is operable to re-energize the at least one catalyst heating device when the catalyst temperature becomes less than a predetermined catalyst light off temperature when the engine is on.

* * * * *